US008443284B2

(12) United States Patent
Lindley et al.

(10) Patent No.: US 8,443,284 B2
(45) Date of Patent: May 14, 2013

(54) SCRIPT-INTEGRATED STORYBOARDS

(75) Inventors: Greg Lindley, Sunnyvale, CA (US); Gary Johnson, San Jose, CA (US); Mike Marinkovich, Santa Clara, CA (US); Alan Cannistraro, San Francisco, CA (US); Evan Doll, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1140 days.

(21) Appl. No.: 11/780,275

(22) Filed: Jul. 19, 2007

(65) Prior Publication Data

US 2009/0024963 A1   Jan. 22, 2009

(51) Int. Cl.
*G06F 3/00* (2006.01)
(52) U.S. Cl.
USPC ............ 715/704; 715/719; 715/848; 715/853
(58) Field of Classification Search .................. 715/704, 715/719, 848, 853
See application file for complete search history.

(56) References Cited

U.S. PATENT DOCUMENTS

| | | | | |
|---|---|---|---|---|
| 6,084,590 | A * | 7/2000 | Robotham et al. | 345/419 |
| 7,478,163 | B2 * | 1/2009 | Alda et al. | 709/229 |
| 2003/0174286 | A1 | 9/2003 | Trumbull | |
| 2004/0012641 | A1 * | 1/2004 | Gauthier | 345/848 |
| 2005/0022125 | A1 * | 1/2005 | Powell | 715/704 |
| 2006/0106494 | A1 | 5/2006 | Alvarez et al. | |
| 2007/0146360 | A1 * | 6/2007 | Clatworthy et al. | 345/419 |
| 2007/0147654 | A1 | 6/2007 | Clatworthy et al. | |
| 2007/0162854 | A1 | 7/2007 | Kikinis | |

FOREIGN PATENT DOCUMENTS

WO     WO 00/67139     11/2000

OTHER PUBLICATIONS

International Search Report and Written Opinion for corresponding International Application No. PCT/US2008/069603, mailed Apr. 28, 2009.

Liu, Zhi-Qiang, and Leung, Ka-Ming, "Script Visualization (ScriptViz): A Smart System that Makes Writing Fun," *Soft Computing: A Fusion of Foundations, Methodologies and Applications*, Springer-Verlag, Berlin, vol. 10, No. 1, Jan. 1, 2006, pp. 34-40.

(Continued)

*Primary Examiner* — Michael Roswell
(74) *Attorney, Agent, or Firm* — Schwegman Lundberg & Woessner, P.A.

(57) ABSTRACT

A storyboard presentation is generated by launching a scene design tool that includes actor and camera placement tools. Using the actor and camera placement tools, a first actor icon and a first camera icon are added on a scene layout, the first actor icon representing a first actor that will appear in a scene and the first camera icon representing a first camera that will film the scene. The user is enabled to control a location and orientation of the first actor icon using the actor placement tool and a location and orientation of the first camera icon relative to the first actor icon using the camera placement tool. Based on the location and orientation of the first actor icon and the first camera icon, a first projection of the scene featuring the first actor as seen from the first camera is generated.

26 Claims, 12 Drawing Sheets

OTHER PUBLICATIONS

Kenworthy, C., "FrameForge 3D Studio 2," *3D World*, May 2006, p. 98, reprinted from http://frameforge3d.com/3DWrld-med-res.pdf, retrieved on Mar. 9, 2009.

"FrameForge 3D Studio 2: Quick Start Guide," ©2003-2006 Innoventive Software, LLC, Oct. 8, 2008, pp. 1-15, retrieved from http://www.moviesoft.fr/documentation/FrameForge%202%20Quick%Start.pdf on Mar. 9, 2009.

European Partial Search Report for corresponding EPO Application No. 08012690.7, mailed Nov. 10, 2008.

European Office Action for Application No. 08012690.7 mailed Nov. 19, 2010 (5 pages).

* cited by examiner

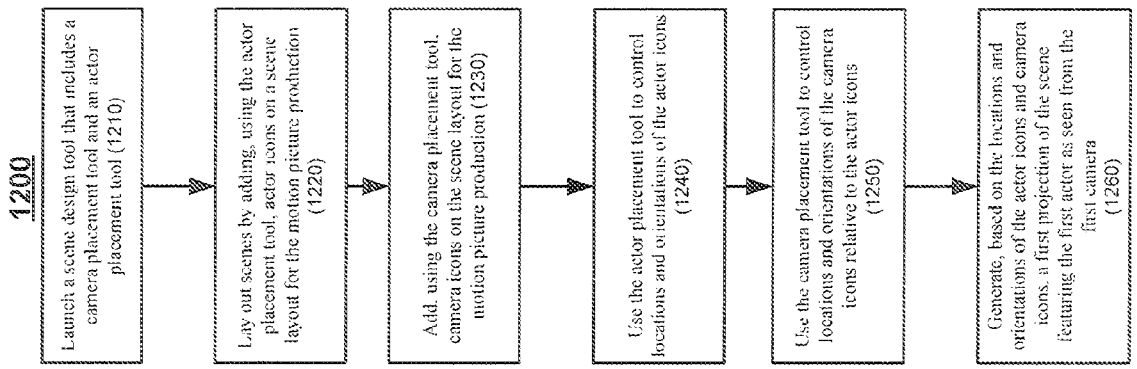

SCRIPT-INTEGRATED STORYBOARDS

TECHNICAL FIELD

This document relates to producing motion picture content.

BACKGROUND

Producing motion pictures can be an exciting project. Motion picture productions can range from major studio epics to documentaries produced by small independent film makers. The major studio epic can encompass a large cast and crew with large inventories of equipment, while the smaller film may include a smaller cast and crew with limited inventories. Even smaller productions may involve multiple locations and include multiple scenes with different shots within a scene.

SUMMARY

In one general sense, a storyboard presentation for a motion picture production is generated by launching a scene design tool that includes a camera placement tool and an actor placement tool. Using the actor placement tool, a first actor icon is added on a scene layout for a motion picture production, the first actor icon representing a first actor that will appear in a scene in the motion picture production. Using the camera placement tool, the first camera icon is added on a scene layout for the motion picture production, the first camera icon representing a first camera that will film the scene. The user is enabled to control a location and orientation of the first actor icon using the actor placement tool. The user also is enabled to control a location and orientation of the first camera icon relative to the first actor icon using the camera placement tool. Based on the location and orientation of the first actor icon and the first camera icon, a first projection of the scene featuring the first actor as seen from the first camera is generated.

Implementations may include one or more of the following features. For example, the actor placement tool may be used to control a location and orientation of a second actor icon, relative to the first actor icon, in the scene layout, wherein the second actor icon represents a second actor that will appear in the scene. Based on the location and orientation of the first actor icon and the second actor icon, the first projection is generated of the scene featuring the first actor and the second actor as seen from the first camera. Generating the first projection of the scene featuring the first actor and the second actor may include generating the first projection that reflects the location and orientation of the first actor icon relative to the second actor icon. The user may be enabled to reconfigure the location and orientation of the first actor icon or the second actor icon, and the first projection may be updated based on the reconfigured location and orientation. Updating the first projection based on the reconfigured location and orientation may include enabling the user to shift the location and orientation of the first actor icon or the second actor icon. For at least one intermediary location in the shift of location and orientation from a first setting to a second setting, updating the first projection to reflect a configuration using the intermediary location.

The user may be enabled to control a field of view for the first camera and the first projection of the scene may be configured featuring the first actor as seen from the first camera based on the field of view. The scene layout may be configured to reflect the field of view. The user may be enabled to specify a first segment that will be captured using the first camera at a first location in the scene layout and to specify a second segment that will be captured using the first camera at a second location in the scene layout. A first projection may be generated based on the first segment, and a second projection may be generated based on the second segment. A second camera icon may be added on the scene layout using the camera placement tool, the second camera icon representing a second camera that will film the scene. The user may use the camera placement tool to control a location and orientation of the second camera icon. The user may be enabled to specify a first segment that will be captured using the first camera at a first location in the scene layout and to specify a second segment that will be captured using the second camera at a second location in the scene layout. A first projection based on the first segment and a second projection based on the second segment may be generated.

Enabling the user to control the location and orientation of the first camera icon relative to the first actor icon may include enabling the user to specify a vertical camera orientation indicating a direction of the first camera. Enabling the user to control the location and orientation of the first camera icon relative to the first actor icon may include enabling the user to specify a horizontal camera orientation relative to the first actor icon. Enabling the user to control the location and orientation of the first camera icon relative to the first actor icon may include enabling the user to specify a distance between the first camera icon and the first actor icon.

A script that includes dialog may be accessed. A first portion of the dialog may be associated with a first segment used in the scene layout and a second portion of the dialog may be associated with a second segment used in the scene layout. The first projection may be based on the first segment and a second projection may be based on the second segment. The first portion of the dialog may be presented with the first projection and the second portion of the dialog may be presented with the second projection. Accessing the script that includes the dialog may include accessing the script that includes segment designators, using the segment designators to associate the first portion of the dialog with the first segment, and using the segment designators to associate the second portion of the dialog with the second segment.

The scene design tool may be used to generate a first configuration for the first segment, and a second configuration for the second segment. The user may be enabled to specify a moving camera path for the first camera using the first camera icon using the camera placement tool. The first projection of the scene may be configured to reflect the movement of the first camera. The first actor icon may be associated with a first identity, and a script may be modified to reflect the first identity. The user may be enabled to interact with the first actor icon to change the first actor icon to be associated with a second identity. The script may be modified to reflect the second identity. Enabling the user to interact with the first actor icon may include enabling the user to interact with a drop down controller embedded in the first actor icon enabling the user to select from available characters in the script. Enabling the user to interact with the first actor icon may include enabling the user to interact with a drop down controller embedded in the first actor icon enabling the user to select from available actors. A configuration for the scene design tool may be accessed, and the configuration may be used to identify required resources that include actors and equipment, and a display with the required resources may be generated.

A production schedule of more than one segment that will be filmed in a designated time period may be referenced and a configuration may be accessed for segments in the production schedule. A production guide is generated, the production guide displaying, for each of segments within the designated time period, a location, a segment projection, a list of actors required by the segment at the location, a list of required cameras at the location, a list of shots within the segment at the location, and an allocated time window. The production guide may include a map of the locations where the segment is filmed and a description of a camera angle, a shot framing, and a description of the camera movement.

Implementations of any of the techniques described may include a method or process, an apparatus or system, or computer software on a computer-accessible medium

DESCRIPTION OF DRAWINGS

FIGS. 11 and 12 are flow charts of processes by which projections of a segment in a movie are generating using a scene design tool.

DETAILED DESCRIPTION

Figure 1:
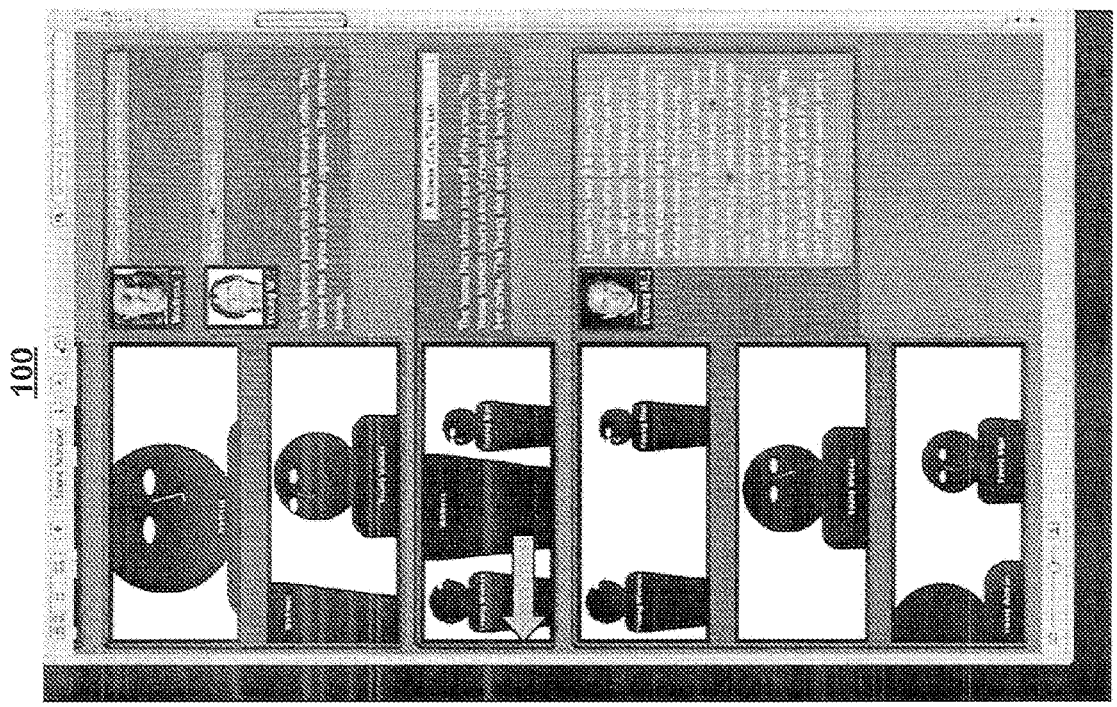
FIG. 1 is a GUI (Graphical User Interface) of a scene design tool enabling a user to perceive a projection in association with dialog from a script.

Preparing and managing a motion picture production can be a complex undertaking. In an aesthetic sense, a motion picture production may involve scores of scenes involving hundreds of shots. Each of the scenes may involve different actors at different locations, and require a crew to create a "set" at each location in order to film the desired shots, sometimes using several different cameras.

As a result, the costs involved with paying actors and a crew, and providing the necessary equipment can be dramatic, irrespective of whether the production is a studio epic or an independent documentary produced for $25,000. Oftentimes, these personnel and equipment costs are incurred on a per-day basis due to personnel wages and equipment rentals for film cameras. A producer will try to manage costs by producing a movie in the least amount of time possible, and more precisely, filming the different scenes according to a production schedule designed to capture the necessary footage in an allocated window of time. Thus, a producer may schedule three different scenes in a movie for production on a first day of filming.

Even a single scene may require a great deal of advance work and preparation. A director simply does not have the time to work with actors in their preparation, instruct the crew how the "set" should be created, and instruct the camera operators about the various shots that will be captured within the scene. The time constraints are even more acute once actual production has begun as a director may simply have limited time to manage a small set of issues once production has begun. A director would rather generate instructions in advance of production so that personnel can prepare for their responsibilities, identify problems in advance, and work through challenges with the director before production has commenced, a point after which the director's time is extremely limited.

In order to generate these instructions, a producer relies on a scene design tool that generates a storyboard presentation for a motion picture production. The scene design tool includes a camera placement tool and an actor placement tool. The producer adds, using the actor placement tool, a first actor icon on a scene layout for a motion picture production. The first actor icon represents a first actor that will appear in a scene in the motion picture production. The producer uses the first actor icon to represent where a first actor should be appearing and facing in the scene, for example, relative to other objects (e.g., a table and other actors). The producer also adds, using the camera placement tool, a first camera icon on a scene layout for the motion picture production. The first camera icon represents a first camera that will film the segment. Setting up the cameras for a scene, even using a temporary set on an otherwise ordinary street, can become a laborious task. Placing the cameras in a scene layout enables actors to understand where they need to position themselves relative to a camera and enables the crew to install the cameras and supporting gear in advance of production.

The producer then uses the actor placement tool to control a location and orientation of the first actor icon and also uses the camera placement tool to control a location and orientation of the first camera icon relative to the first actor icon. For example, the producer may position a camera to catch a side profile of the actor with the camera positioned to "look" slightly up.

Based on the location and orientation of the first actor icon and the first camera icon, the scene design tool then generates a first projection of the scene featuring the first actor as seen from the first camera. For example, the scene design tool may generate a storyboard that gives a viewer a sense of how the shot would appear based on the present locations and configurations (e.g., focal length) of the camera relative to the location and orientation of the actors. The storyboard is integrated with a script so that a viewer may perceive the dialog in association with a particular shot. The storyboard then may be distributed to actors and crew in advance of production to aid in preparation.

FIG. 1 is a GUI 100 of a scene design tool enabling a user to perceive a projection in association with dialog from a script. Generally, GUI 100 represents one type of storyboard product that may be produced using a scene design tool. Once produced, the storyboard product may be distributed to cast and crew. An actor may use the storyboard product to provide an indication of how a director generally "sees" a "shot" (or a segment within a scene) being filmed. The actor may then focus on those aspects of their performance that will be the subject of the shot. For example, the actor may focus on minute aspects of their facial expression in advance of production. Likewise, a cameraman can review the storyboard product to prepare for the shots that will be captured during a particular scene. The cameraman may verify that the equipment has been properly situation and configured, using for example, the right lens and the right settings on the equipment.

GUI 100 includes a sequence of projections in the left column accompanied by associated dialog from the script in the right column. The first projection includes a "close up" projection of "Waitress," who says, "Can I get anyone anymore coffee?" The next projection shifts focus to "Young Woman," who responds, "Oh yes, thank you." A third projection then begins with "Waitress" exiting to the left (as indicated by the left arrow appearing with "Waitress" and "Young woman" facing "Young Man"). The script indicates in the accompanying dialog, via a drop down menu, that "Waitress" exits to the left. A description of the scene also appears indicating that the young woman pours a ton of creme in her coffee.

Another sequence of segments appears in which, "Young Man" speaks to "Young Woman" with a lengthy remark. As "Young Man" speaks, the movie switches to two other projections, one focused exclusively on "Young Woman" and then returning to one focused on both actors. The transition to a different projection is annotated in the accompanying script by a red diamond.

Figure 2:
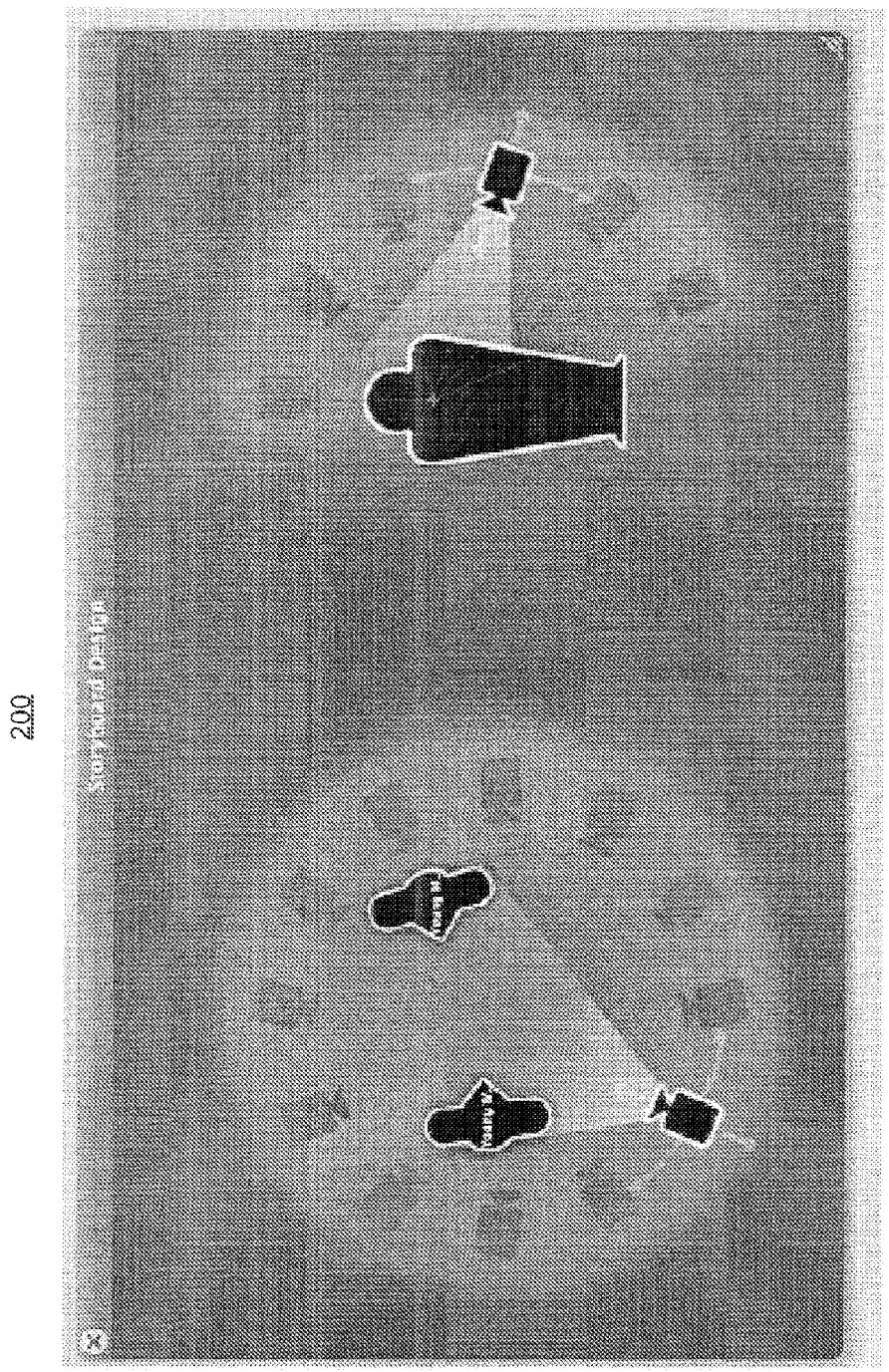
FIG. 2 is a GUI of a camera placement tool and an actor placement tool within a scene design tool enabling a user to control a location and orientation of camera and actor icons

FIG. 2 is a GUI 200 of a camera placement tool and an actor placement tool within a scene design tool enabling a user to control a location and orientation of camera and actor icons. In particular, GUI 200 includes a "top down" projection and a lateral projection. The "top down" projection includes two actor icons and a camera icon. Each of the actor icons may be placed in the map of the location to indicate where the actors should stand. A user also may control the orientation of the actor icons to indicate the directions in which users should face. Thus, by using a drag and drop control (or other control) and positioning and rotating actor icons within a scene, a user may create a map of where the actors should stand relative to one another and where they should be facing.

The camera placement tool enables a user to designate where a camera should be placed relative to other objects in the scene, such as the actors. As shown, the camera placement tool indicates that the camera may be rotated around the actor icons in the scene. The rotational control also enables a user to specify the distance from the action that the camera should be placed. The user may, for example, drag the camera icon further away (or closer) to the subject matter to indicate where the camera should be placed during production. As the distance is varied, the projection may be updated to reflect the generated projection from the present location of the camera.

The lateral projection also indicates the angle in which a camera should be placed relative to the subject matter (or the projected horizon). As shown, the camera icon is configured to capture the actor icon at a slight upwards angle. The camera also is focused on the actor's chest. The position of the camera in the lateral view may be reconfigured to vary the focal point. For example, the height of the camera may be increased to move the focal point to an actor's head from the actor's chest. The lateral projection also includes a rotational control enabling the angle of the camera to be modified.

Both the "top down" and lateral projection include a focal control enabling a user to specify the field of view. As shown in the "top down" control, the field of view is configured to capture each actor at the edge of the field of view. The field of view may be modified.

Figure 3:
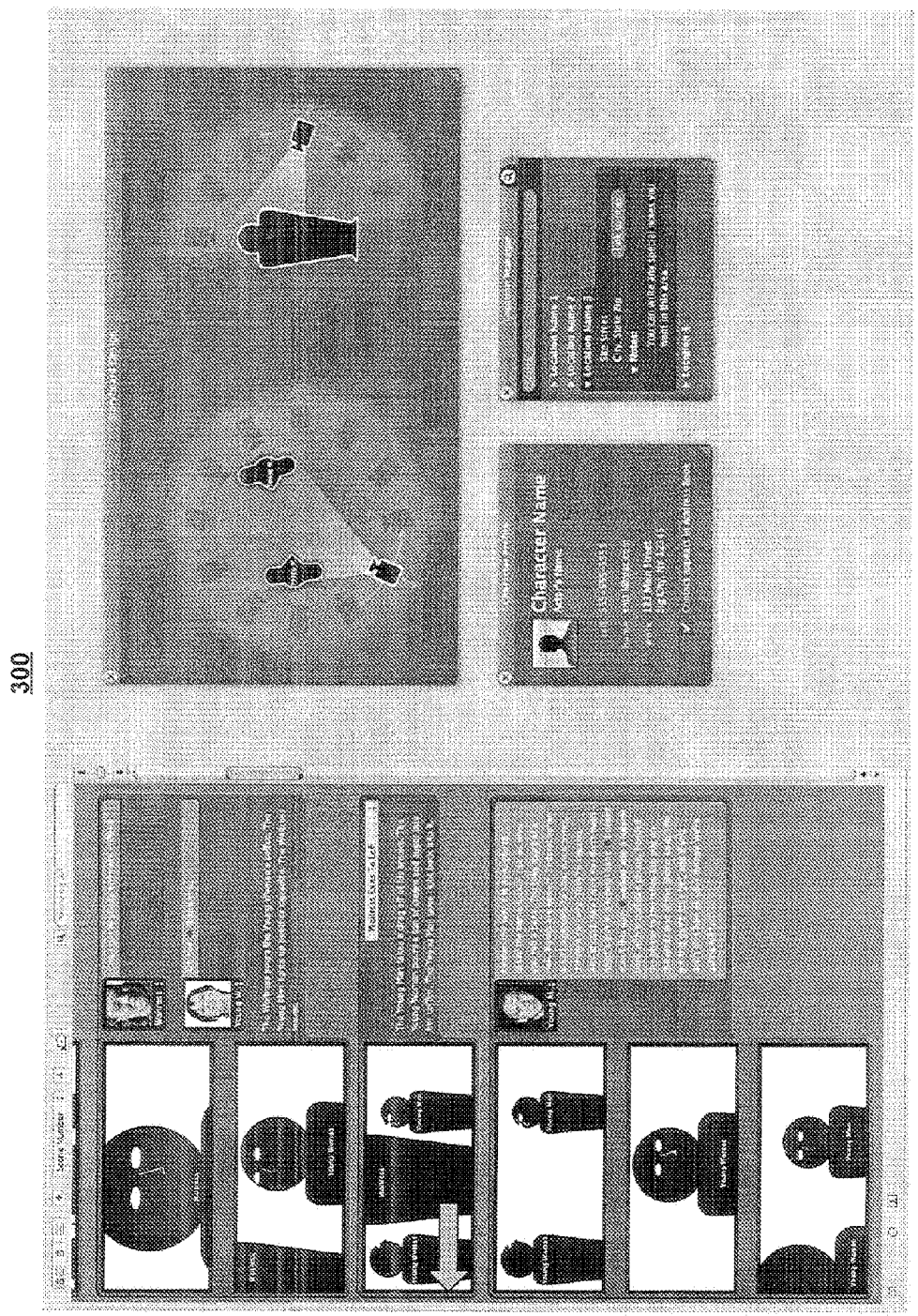
FIG. 3 is a GUI of a scene design tool enabling a user to perceive a configuration for a camera placement tool and an actor placement tool and the projection that results from the configuration.

FIG. 3 is a GUI 300 of a scene design tool enabling a user to perceive a configuration for a camera placement tool and an actor placement tool and the projection that results from the configuration. As shown, GUI 300 allows the user to control the placement of the camera and actor icons in the "storyboard design" window, and perceive the resulting projection resulting from the location and orientation of the storyboard design window. For example, as the user moves the camera further out, the resulting projection encompasses a wider field of view with the projected size of the actors becoming smaller so long as the focal length stays the same. Similarly, when the camera is rotated, the projection for the segment is updated to reflect use of the camera from the new, rotated position.

Although GUI 300 only shows one camera, GUI 300 may be configured to use more than one camera in generating projections. For example, a first projection may be used to capture "head on" footage of two actors speaking to one another in a first segment. Within the same scene layout, the footage may switch to a second projection based on use of a second camera to capture a side profile of a second actor speaking.

Figure 4:
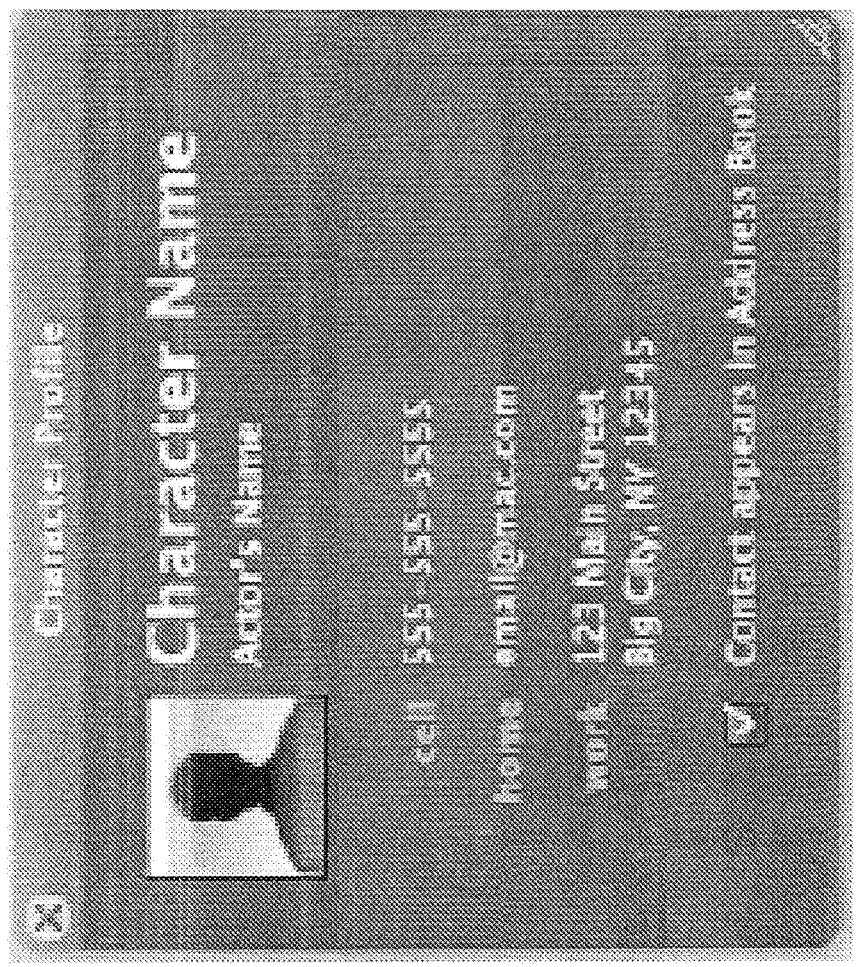
FIG. 4 is a GUI of a character profile for an actor that appears in a scene accessed by a scene design tool.

GUI 300 also includes a character profile and a location manager. Generally, the character profile may be used to manage the contact information for actors appearing in a motion picture production. A motion picture production may involve scores of actors required to be at different locations at specified times. The character profile may be used to generate phone, email, and mail correspondence that informs an actor where they are required to be at a particular time. FIG. 4 is a GUI 400 of a character profile for an actor that appears in a scene accessed by a scene design tool. GUI 400 enables the user to specify contact information including a phone number, an email address, and a mailing address. GUI 400 also indicates that the contact appears in the user's address book application. GUIs 300 and 400 also illustrate how the casting of an actor in a particular role may be changed. For example, in the accompanying dialog shown in GUI 300, an image of the actor appears in association with a drop down control. The user may select the drop down control and identify another character that should be used instead of the previously selected actor. Selection of a different character results in the projection and actor placement tool being modified to reflect use of the newly selected actor in place of the previously-selected actor. In one implementation, the label (e.g., name) associated with a projected actor and actor icon is updated. In another implementation where the silhouette of the projection reflects character specific-features (e.g., gender and/or age information such as an actress that wears a dress), selecting a different character also updates the silhouette that is projected.

Figure 5:
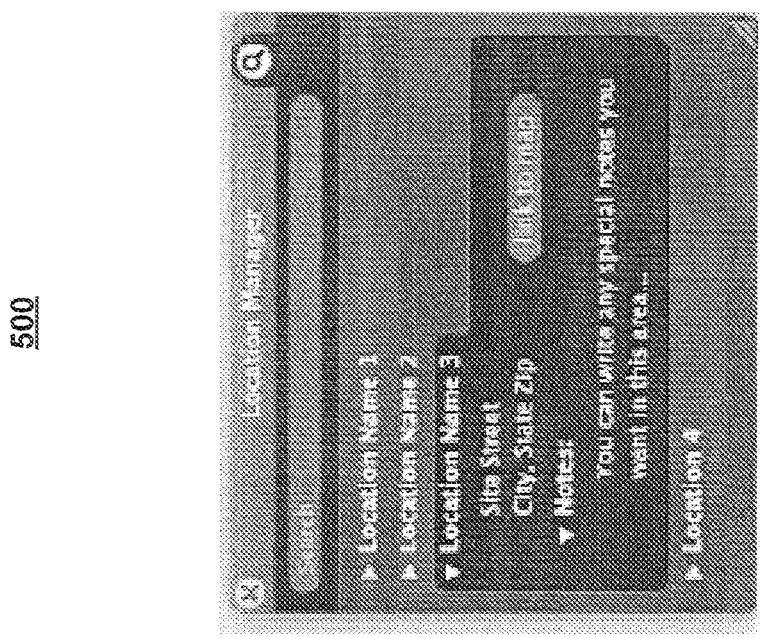
FIG. 5 is a GUI of a location manager for locations that are used in scenes accessed by a scene design tool.

As is shown in FIG. 5 with GUI 500, a location manager enables a user to specify information for locations that are used in scenes accessed by a scene design tool. The user may link a particular location to a map. As a result, correspondence that is sent to a user informing the user to be at a particular location at a particular time to capture a particular segment also may include a map of the location. The location manager also may be used to generate a production schedule with a description of what actors, crew, and resources are required at a particular location. For example, the location manager may be used to specify that three scenes being configured in the scene design tool should be filmed at a particular location. A production schedule then may be generated that indicates which actors and crew need to appear at the location at a particular time along with the required resource (e.g., cameras).

Figure 6:
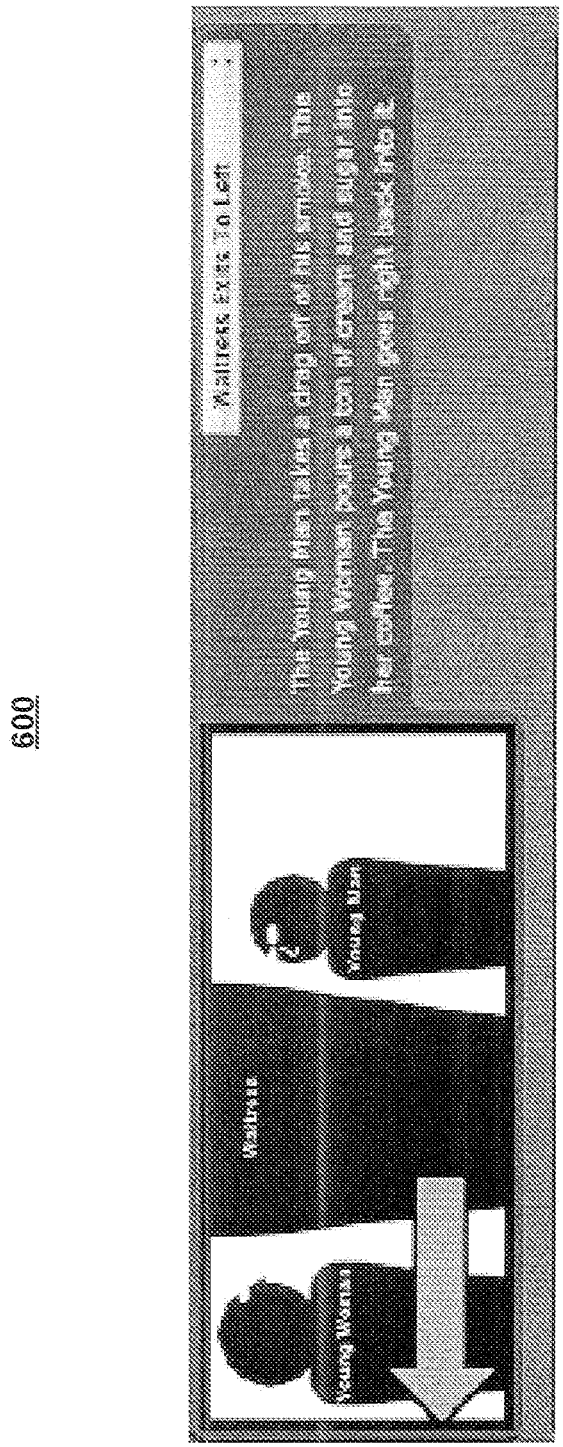
FIG. 6 is a GUI of a projection with a label describing movement within a segment.

FIG. 6 is a GUI 600 of a projection with a label describing movement within a segment (e.g., a "shot" or "take"). More precisely, GUI 600 enables the user to select a character appearing in the projection and generate a label describing an action for the character. In one instance, selecting the character causes a drop down menu to appear in the accompanying dialog with a list of potential actions for the actor. Selection of one of the actions then causes an indication of the selected action to appear in the projection. In the example shown, an arrow originating with the actress appears, indicating that the actress should exit to the left. Other actions that may appear include character entrances, and character interactions within a scene (e.g., shaking hands).

Figure 7:
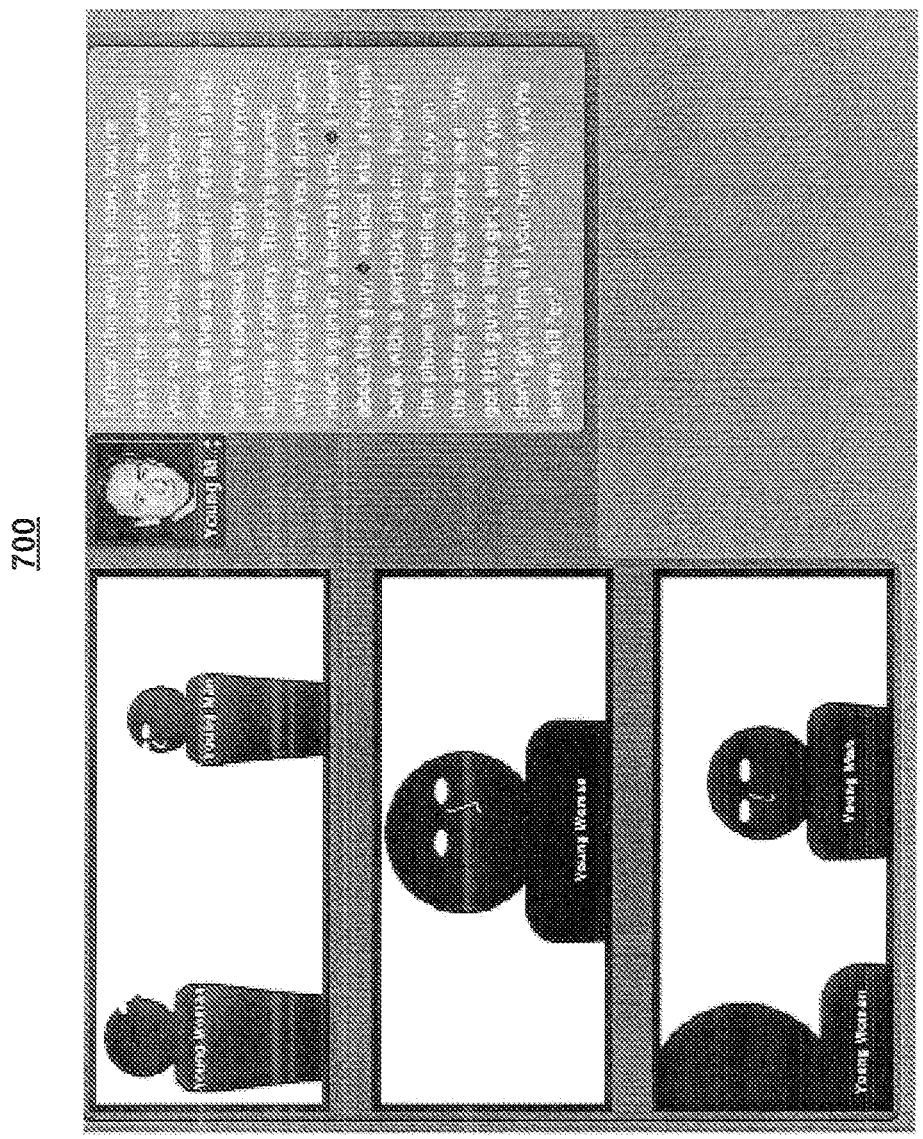
FIG. 7 is a GUI of different projections associated with different segments within a scene where the segments are separated by segment designators appearing in dialog from an associated script.

FIG. 7 is a GUI 700 of different projections associated with different segments within a scene where the segments are separated by segment designators appearing in dialog in an associated script. As shown, three different projections are shown during the dialog of "Young Man." In one implementation, the segment designators are created using a special designator that is "dropped" or placed at a particular instance in the accompanying dialog. Once the segment designator has been dropped over the accompanying dialog, a new projection and configuration for the scene design tool is generated. The initial projection of the newly-added segment may be initially identical to the previously appearing projection and configuration for the scene design tool. The user then may reconfigure the character and camera icons in the scene design tool to reconfigure the projection for the newly added segment. For example, a first camera may be removed and a second camera may be added to the configuration using the scene design tool to generate a projection for the segment based on generating the second projection from a different location.

In addition to permitting segment designators to be dropped over the accompanying dialog, the user also may generate a different segment within a scene by instructing the scene design tool to freeze a configuration for a scene and add a second segment that follows. The second segment may modify the previously-used configuration to generate a second projection. The user then may "grab" the overall configuration, which is represented as a "grabbed" icon, from the scene design tool and drop the configuration onto a particular moment in the accompanying dialog to indicate where the second projection should begin. The user then may release the icon, and, as a result, a second projection for the second segment is generated.

Figure 8:
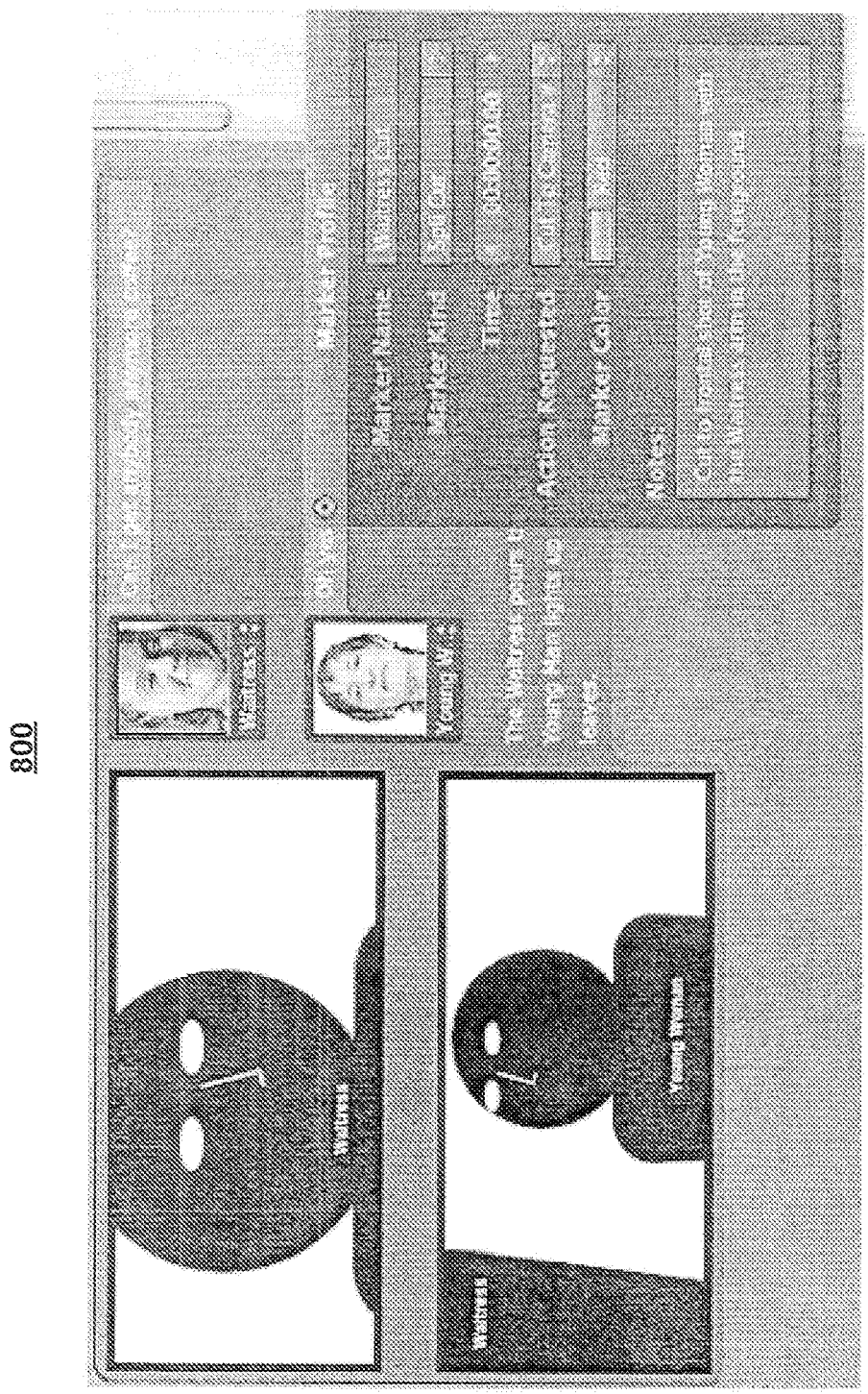
FIG. 8 is a GUI illustrating a configuration for a segment designator.

FIG. 8 is a GUI 800 illustrating a configuration for a segment designator. In particular, GUI 800 illustrates how the action for a segment designator may be named. GUI 800 also provides a description of the action, an indication of when the action occurs, an indication of the type of segment designator (e.g., a split cut), and notes. In one implementation, the description of the action is automatically generated based on the user's instructions to generate a different segment using a different configuration for the scene design tool. Alternatively, the user may drop the segment designator into the accompanying dialog, and specify the next action using a drop down menu, which in turn invokes the scene design tool for the next segment when the user indicates that a different projection is required.

Figure 9:
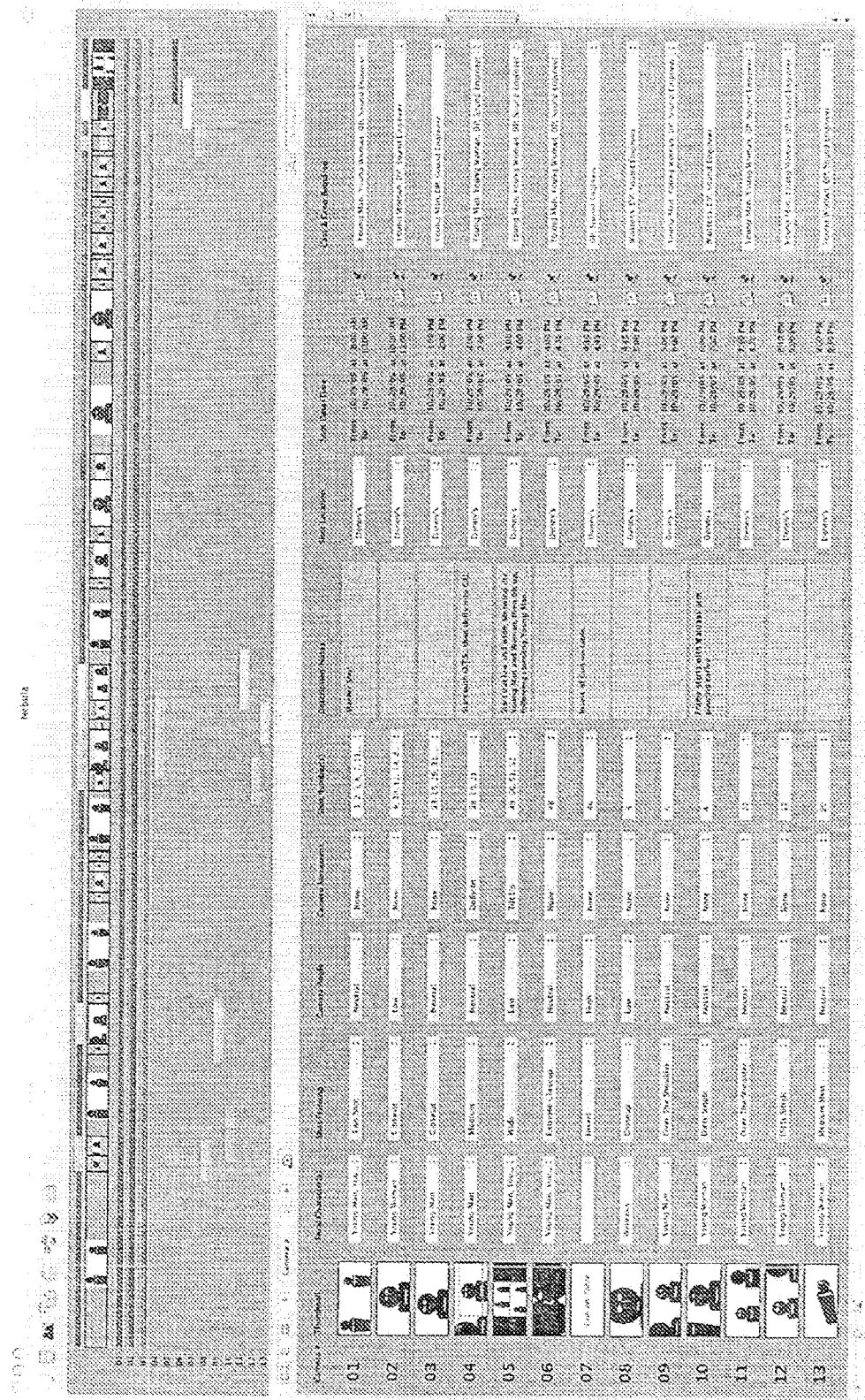
FIG. 9 is a GUI of a production schedule indicating which resources are required at a particular time at a particular location.

FIG. 9 is a GUI 900 of a production schedule indicating which resources are required at a particular time at a particular location. As shown GUI 900 includes, for each camera, a thumbnail projection, a description of the focal characters, a description of the camera angle (e.g., low, medium, high), a description of camera movement (e.g., dolly in, tilt up), a list of shots (segments) associated with a particular configuration, notes, a description of the location, a description of the projected shooting times, and a list of required actors and crew.

The top of GUI 900 also includes a timeline indicating when a particular camera is being used. The timeline includes a series of projections to give a viewer a sense of how the cameras are being used and the footage that is captured as a result. If multiple shots within a scene are required, the projection shows a different projection for each of the segments within a scene.

GUI 900 may be generated by accessing a configuration for each segment that has been created within a scene. An entry describing the resources required to film a scene then may be created by aggregating the configurations from each of the constituent segments within the scene. For example, if two different cameras are required to film a scene at a particular location, the entry for the scene should indicate that the two cameras are required to be on site in a particular configuration to film the scene.

Scheduling production of different scenes within a day may be performed by identifying the time and resources required to film a particular scene, and using the identified time and resources to identify which scenes can be produced without creating a resource conflict. That is, the production may be scheduled by identifying the time and resources required for constituent scenes, and placing the scenes in a production schedule oriented towards the producer's objectives (e.g., by requiring the fewest number of days). To illustrate an example of a scheduling conflict that impacts the production schedule, production of two scenes at two different locations cannot be scheduled in the same time window if the same camera is required at both locations. Other constraints that may be used in regulating a production schedule include lighting conditions (e.g., a scene can only be shot at dawn), labor requirements (e.g., a crew cannot work more than a threshold number of hours/day), and location availability (e.g., a street chase may only be filmed during non-peak traffic conditions). The time to film a scene may be estimated in an automated manner by referencing a script with the dialog for the scene. More precisely, the time required to film a portion of dialog is estimated by multiplying the number of words per minute with the rate at which the dialog is spoken. This metric may be modified to reflect the number of takes (typically at least three), travel and setup times, and the post-production time (e.g., location cleanup).

Figure 10:
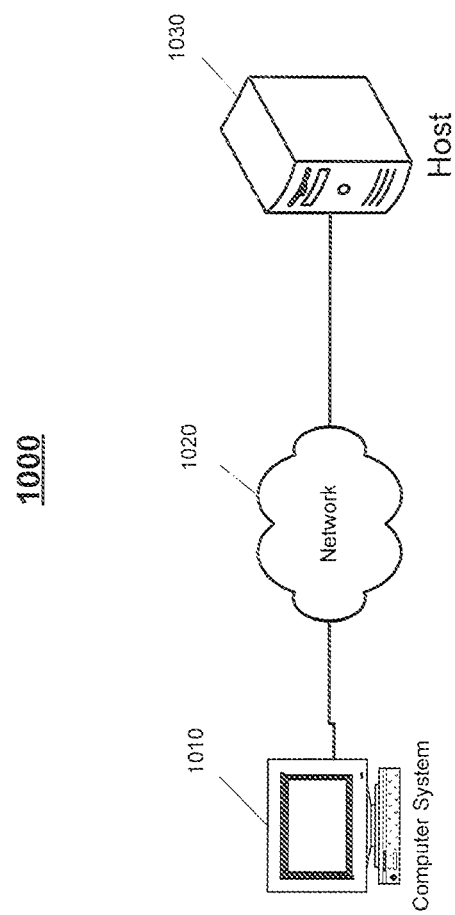
FIG. 10 is a block diagram of a system that generates a projection of a segment in a movie using a scene design tool.

FIG. 10 is a block diagram of a system 1000 that generates a storyboard. The system 1000 includes a client 1010, a network 1020, and a host 1030. Although the communications system 1000 is shown as a network-based system, the system may access media files residing in a standalone device or in a different configuration. For example, the system 1000 may include an iMac™ running MacOS X 10.4 that operates a scene design tool.

Each of the client 1010 and the host 1030 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 1010 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, or storage medium, that is capable of being delivered to the client 1010 or the host 1030.

The client 1010 may include one or more devices capable of accessing content on the host 1030. The host client 1010 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 1010 includes one or more information retrieval software applications (e.g., a browser, a mail application, an instant messaging client, an Internet service provider client, a media player, or another integrated client (e.g., AppleTV™)) capable of exchanging communications. The information retrieval applications may run on a general-purpose operating system and a hardware platform that includes a general-purpose processor and specialized hardware for graphics, communications and/or other capabilities. In another implementation, the client 1010 may include a wireless telephone running a micro-browser application on a reduced operating system with general purpose and specialized hardware capable of operating in mobile environments.

The client 1010 may include one or more media applications. For example, the client 1010 may include a software application that enables the client 1010 to receive and display audio or video content. The media applications may include controls that enable a user to configure the user's media. For example, the client 1010 may include a non-linear editor with a video assembly application.

The network 1020 may include hardware and/or software capable of enabling direct or indirect communications between the client 1010 and the host 1030. As such, the network 1020 may include a direct link between the client and the host, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

Generally, the host 1030 includes one or more devices configured to store digital content. For instance, a host 1030 typically includes a collection or library of content for distribution. Alternatively, or in addition, the host 1030 may convert a media source (e.g., a video or audio feed) into a first feed of data units for transmission across the network 1020. The host 1030 also may include an input/output (I/O) device (e.g., video and audio input and conversion capability), and peripheral equipment such as a communications card or device (e.g., a modem or a network adapter) for exchanging data with the network 1020.

The host 1030 may include a general-purpose computer having a central processor unit (CPU), and memory/storage devices that store data and various programs such as an operating system and one or more application programs. Other examples of a content source 110 include a workstation, a server, a special purpose device or component, a broadcast system, other equipment, or some combination thereof capable of responding to and executing instructions in a defined manner.

The host 1030 may include scene design tools and video editing software configured to edit and assemble video content. In one implementation, the host 1030 is used as a source for templates for scene design tools that are not available on a client 1010. For example, third party software developers may develop very detailed and accurate templates for very particular environments. Thus, a producer may purchase specialized templates offered by a software provider that are not available on the producer's scene design tool on the client 1010. In another implementation, the host 1030 is used as a source of content that is not available on the user's client 1010. For example, a client 101 may access host 1030 browse a repository of screenplays. The host may be configured to permit a user to purchase a screenplay and perform a preliminary scan that parses the scene design tool in order to generate a preliminary placement of systems and actors within the scene design tool.

Figure 11:
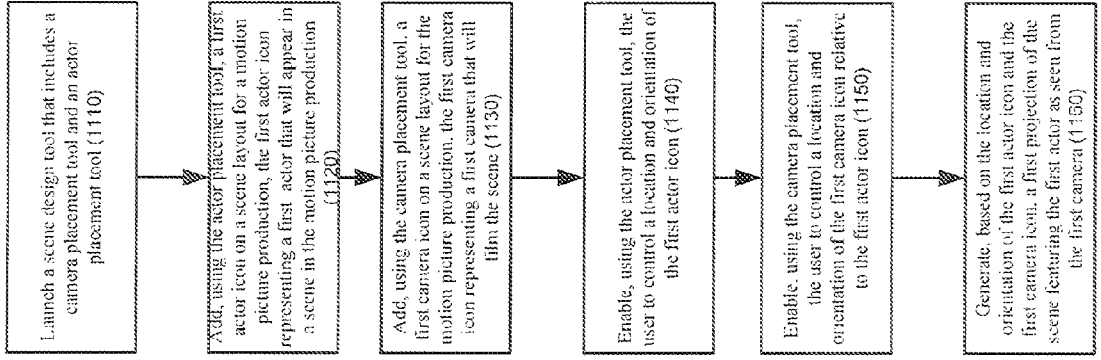

FIG. 11 is a flow chart 1100 of a process by which projections of a segment in a movie are generated using a scene design tool. The system performing the operations described below is generally described as a scene design tool running on a processor. Nevertheless, the operations may be performed on other systems and applications, such as a specialized web browser that interfaces with a host.

In order to generate a storyboard presentation for a motion picture production, a processor launches a scene design tool that includes a camera placement tool and an actor placement tool (1110). For example, a producer may load a screenplay into a scene design tool with a camera placement tool and an actor placement tool. The screenplay then may be parsed in an automated manner so that a preliminary configuration is automatically generated in the scene design tool for one or more segments. The user then adds, using the actor placement tool, a first actor icon on a scene layout for a motion picture production, the first actor icon representing a first actor that will appear in a scene in the motion picture production (1120). The scene design tool may include a toolbar of available actor icons that the user can select and "drop" into a scene. In one implementation, the identities that appear in toolbar are based on the characters (or actors) that have been entered in the character profile application described previously with respect to FIG. 4.

The user then adds, using the camera placement tool, a first camera icon on a scene layout for the motion picture production, the first camera icon representing a first camera that will film the scene (1130). The camera placement tool may be configured to present a list of available equipment (e.g., cameras). The user then may "drag and drop" icons to place camera icons and actor icons within the scene.

The scene design tool then enables, using the actor placement tool, the user to control a location and orientation of the first actor icon (1140). Generally, the actor placement tool enables a user to place icons representing actors within a scene relative to each other, the camera(s), and objects within the scene (e.g., furniture). In one implementation, the actor placement tool includes a drop down control enabling the user to generate a projection of the actor engaged in one of several actions. For example, a user may specify a sport in a first drop down control and an activity within the sport in a second drop down control. Projections of the scene then may project the actor engaged in the specified activity.

The scene design tool then enables, using the camera placement tool, the user to control a location and orientation of the first camera icon relative to the first actor icon (1150). The camera placement tool enables a user to place icons representing cameras that capture video segments (e.g., footage) in a scene relative to the subject matter (and one another). The camera placement tool may include rotational, directional, and distance controls enabling the user to rotate a camera around the subject matter (e.g., an actor or designated "center"), specify the angle (or profile) of the subject matter, and indicate the distance between the subject matter and the camera. The camera placement tool may include focal controls that indicate the focal length and field of view that should be used to capture the subject matter. The focal length may be specified by enabling a user to "grab" the field of view, and control the width and depth of the field of view relative to a previous focal length and field of view.

The camera placement tool also may include movement controls that enable the user to designate camera movement and changes in focus. For example, the camera placement tool may be configured to specify starting and ending places, and a time over which the camera is moved. Similarly, the camera may be configured with a starting focal point and an ending focal point and a time over which the focal point is transitioned.

The scene design tool then generates, based on the location and orientation of the first actor icon and the first camera icon, a first projection of the scene featuring the first actor as seen from the first camera (1160). For example, a sequence of storyboards may be generated with the script interjected in each of the respective storyboards in the storyboard presentation.

FIG. 12 is a flow chart 1200 of a process by which projections of a segment in a movie are generating using a scene design tool. Although the operations performed to generate a storyboard presentation for a motion picture production are described as being performed on a scene design tool on a standalone client, the operations also may be performed on other systems, such as a client interfacing with a host.

Initially, a producer planning a small scale motion picture launches a scene design tool that includes a camera placement tool and an actor placement tool (1210). The producer has several cameras that have been secured for production over a week, and has identified several actors that will appear in the motion picture. The producer then begins laying out scenes by adding, using the actor placement tool, actor icons on a scene layout for the motion picture production (1220). For example, a producer may designate that a first scene should be filmed in an office. The first scene features three characters with PERSON_A playing ROLE_A, PERSON_B playing ROLE_B, and PERSON_C playing ROLE_C. Contact information for each of the actors with photos has been added from the producer's electronic address book. The producer may specify a hierarchy of preferences for casting and use electronic invitations to confirm actor participation. Thus, if PERSON_A does not acknowledge and agree to participate in the motion picture production by a designated time, a backup actor (PERSON_D) can be cast in ROLE_A. If the PERSON_D's participation has been secured in advance, the failure of PERSON_A to respond by the designated time may trigger automatic replacement of PERSON_A in the scene design tool with PERSON_D.

The producer then adds, using the camera placement tool, camera icons on the scene layout for the motion picture production (1230). For example, the producer may specify that a particular camera suited for indoor productions should be used to film the office scene.

The producer then uses the actor placement tool to control locations and orientations of the actor icons (1240). For example, the producer may specify that the ROLE_A and ROLE_B should be facing one another in an office when ROLE_C enters from the right with breaking news. The producer then uses the camera placement tool to control locations and orientations of the camera icons relative to the actor icons (1250). The producer may specify that the first camera should be positioned to capture a side profile of the actors and the focal length should be wide enough to capture ROLE_C entering from the right through a particular door.

The producer then generates, based on the locations and orientations of the actor icons and camera icons, a first projection of the scene featuring the first actor as seen from the first camera (1260). First, the producer generates a presentation with the storyboard sequence and distributes the presentation to the cast and crew. The presentation includes dialog from a script that has been integrated with the storyboard. Second, the producer generates a production schedule with a description of the resources that are required at a particular location. More precisely, the production schedule includes a location, a segment projection, a list of actors required by the segment at the location, a list of required cameras at the location, a list of shots within the segment at the location, and an allocated time window. The production schedule can be distributed to a set manager who ensures that the necessary personnel and equipment are ready for production at the necessary time.

Other implementations are within the scope of the following claims. For example, although many of the operations as identifying a particular type of activity or a particular actor, other characteristics may be used to configure a scene. In one instance, lighting characteristics are specified.

What is claimed is:

1. A method of generating a storyboard presentation for a motion picture production with a scene design tool that includes a camera placement tool and an actor placement tool, the method comprising:

receiving a first input through use of the actor placement tool of a first actor icon on a scene layout for a motion picture production, the first actor icon representing a first actor that will appear in a scene in the motion picture production;

receiving a second input through use of the camera placement tool of a first camera icon on the scene layout for the motion picture production, the first camera icon representing a first camera that will film the scene;

providing via the actor placement tool, an actor control configured to enable a user to map a location and an orientation of the first actor icon;

providing via the camera placement tool, a camera control configured to enable the user to map a location and an orientation of the first camera icon relative to the first actor icon;

accessing a script associated with the scene that includes a scene dialog having a first portion of dialogue and a second portion of dialogue that is contiguous with and follows the first portion of dialogue;

placing, in response to a third input from the user, a segment designator into the scene dialog to indicate that the first portion of dialogue that should be associated with a first projection and the second portion of dialogue that should be associated with a second projection, the segment designator being depicted as a designator in the scene dialog;

generating, based on the location and orientation of the first actor icon and the first camera icon, the first projection of the scene featuring the first actor as seen from the first camera; and configuring the first projection to reflect the first portion of dialogue.

2. The method of claim 1 further comprising:

the actor placement tool configured to control a location and an orientation of a second actor icon, relative to the first actor icon, in the scene layout, wherein the second actor icon represents a second actor that will appear in the scene;

generating, based on the location and orientation of the first actor icon and the second actor icon, the first projection of the scene featuring the first actor and the second actor as seen from the first camera.

3. The method of claim 2 wherein generating the first projection of the scene featuring the first actor and the second actor includes generating the first projection that reflects the location and orientation of the first actor icon relative to the second actor icon.

4. The method of claim 2 further comprising:
the actor control configured to enable the user to reconfigure the location and orientation of the first actor icon or the second actor icon; and
updating the first projection based on the reconfigured location and orientation.

5. The method of claim 4 wherein updating the first projection based on the reconfigured location and orientation includes:
receiving a fourth input from the user, through the use of the actor placement tool, to shift the location and orientation of the first actor icon or the second actor icon; and
for at least one intermediary location in the shift of location and orientation from a first setting to a second setting, updating the first projection to reflect a configuration using the intermediary location.

6. The method of claim 1 further comprising:
the camera control configured to enable the user to control a field of view for the first camera;
configuring the first projection of the scene featuring the first actor as seen from the first camera based on the field of view.

7. The method of claim 6 further comprising configuring the scene layout to reflect the field of view.

8. The method of claim 1 further comprising:
placing, in response to a fourth input from the user, a first segment that will be captured using the first camera at a first location in the scene layout;
placing, in response to a fifth input from the user, a second segment that will be captured using the first camera at a second location in the scene layout;
generating a first projection based on the first segment; and
generating a second projection based on the second segment.

9. The method of claim 1 further comprising:
receiving a fourth input through use of the camera placement tool, a second camera icon on the scene layout, the second camera icon representing a second camera that will film the scene;
providing via the camera placement tool, the camera control configured to enable the user to control a location and orientation of the second camera icon;
enabling the user to specify a first segment that will be captured using the first camera at a first location in the scene layout;
enabling the user to specify a second segment that will be captured using the second camera at a second location in the scene layout;
generating a first projection based on the first segment; and
generating a second projection based on the second segment.

10. The method of claim 1 wherein the camera control is further configured to enable the user to specify a vertical camera orientation indicating a direction of the first camera.

11. The method of claim 1 wherein the camera control is further configured to enable the user to specify a horizontal camera orientation relative to the first actor icon.

12. The method of claim 1 wherein the camera control is further configured to enable the user to specify a distance between the first camera icon and the first actor icon.

13. The method of claim 1 further comprising:
associating a first portion of the dialog with a first segment used in the scene layout;
associating a second portion of the dialog with a second segment used in the scene layout;
generating the first projection based on the first segment;
generating a second projection based on the second segment;
presenting the first portion of the dialog with the first projection; and
presenting the second portion of the dialog with the second projection.

14. The method of claim 13 wherein accessing the script that includes the dialog includes:
accessing the script that includes segment designators;
using the segment designators to associate the first portion of the dialog with the first segment; and
using the segment designators to associate the second portion of the dialog with the second segment.

15. The method of claim 14 further comprising:
using the scene design tool to generate a first configuration for the first segment; and
using the scene design tool to generate a second configuration for the second segment.

16. The method of claim 1 further comprising:
providing via the camera placement tool, a camera control configured to enable the user to specify a moving camera path for the first camera using the first camera icon; and
configuring the first projection of the scene to reflect the movement of the first camera.

17. The method of claim 1 further comprising:
associating the first actor icon with a first identity;
modifying a script to reflect the first identity;
enabling the user to interact with the first actor icon to change the first actor icon to be associated with a second identity; and
modifying the script to reflect the second identity.

18. The method of claim 17 wherein enabling the user to interact with the first actor icon includes enabling the user to interact with a drop down controller embedded in the first actor icon enabling the user to select from available characters in the script.

19. The method of claim 17 wherein enabling the user to interact with the first actor icon includes enabling the user to interact with a drop down controller embedded in the first actor icon enabling the user to select from available actors.

20. The method of claim 1 further comprising:
accessing a configuration for the scene design tool;
using the configuration to identify required resources that include actors and equipment; and
generating a display with the required resources.

21. The method of claim 20 further comprising:
referencing a production schedule of more than one segment that will be filmed in a designated time period;
accessing a configuration for segments in the production schedule; and
generating a production guide, the production guide displaying for each of segments within the designated time period:
a location,
a segment projection,
a list of actors required by the segment at the location,
a list of required cameras at the location,
a list of shots within the segment at the location, and
an allocated time window.

22. The method of claim 21 wherein the production guide includes a map of the locations where the segment is filmed.

23. The method of claim 21 wherein the production guide includes a description of a camera angle, a shot framing, and a description of the camera movement.

24. A system comprising:
a processor;
a machine readable storage medium having a plurality of instructions that, when executed by the processor, perform operations comprising, generating a storyboard presentation for a motion picture production using a scene design tool that includes:
a camera placement tool,
an actor placement tool, and
wherein the operations further comprise,
receiving a first input through use of the actor placement tool of a first actor icon on a scene layout for a motion picture production, the first actor icon representing a first actor that will appear in a scene in the motion picture production;
receiving a second input through use of the camera placement tool of a first camera icon on a scene layout for the motion picture production, the first camera icon representing a first camera that will film the scene;
provide via the actor placement tool, an actor control configured to enable a user to map a location and orientation of the first actor icon;
provide via the camera placement tool, a camera control configured to enable the user to map a location and orientation of the first camera icon relative to the first actor icon;
access a script associated with the scene that includes a scene dialog a first portion of dialogue and a second portion of dialogue that is contiguous with and follows the first portion of dialogue;
place, in response to an input from the user, a segment designator into the scene dialog to indicate that the first portion of dialogue that should be associated with a first projection and the second portion of dialogue that should be associated with a second projection, the segment designator being depicted as a designator in the scene dialog;
generate, based on the location and orientation of the first actor icon and the first camera icon, the first projection of the scene featuring the first actor as seen from the first camera; and
configuring the first projection to reflect the first portion of dialogue.

25. A system that generates a storyboard presentation for a motion picture production, the system comprising:
means for launching a scene design tool that includes a camera placement tool and an actor placement tool;
means for adding, using the actor placement tool, a first actor icon on a scene layout for a motion picture production, the first actor icon representing a first actor that will appear in a scene in the motion picture production;
means for adding, using the camera placement tool, the first camera icon on a scene layout for the motion picture production, the first camera icon representing a first camera that will film the scene;
means for enabling, using the actor placement tool, the user to control a location and orientation of the first actor icon;
means for enabling, using the camera placement tool, the user to control a location and orientation of the first camera icon relative to the first actor icon;
means for accessing a script associated with the scene that includes a scene dialog having a first portion of dialogue and a second portion of dialogue that is contiguous with and follows the first portion of dialogue;
means for enabling the user to insert a segment designator into the scene dialog to indicate that the first portion of dialogue that should be associated with a first projection and the second portion of dialogue that should be associated with a second projection, the segment designator being depicted as a designator in the scene dialog;
means for generating, based on the location and orientation of the first actor icon and the first camera icon, the first projection of the scene featuring the first actor as seen from the first camera; and
means for configuring the first projection to reflect the first portion of dialogue.

26. A system that generates a storyboard presentation for a motion picture production, the system comprising instructions on a computer readable medium that when executed on a processor cause the processor to:
launch a scene design tool that includes a camera placement tool and an actor placement tool;
receive a first input, through use of the actor placement tool, a first actor icon on a scene layout for a motion picture production, the first actor icon representing a first actor that will appear in a scene in the motion picture production;
receive a second input, through use of the camera placement tool, the first camera icon on a scene layout for the motion picture production, the first camera icon representing a first camera that will film the scene;
provide via the actor placement tool, an actor control configured to enable a user to control a location and orientation of the first actor icon;
provide via the camera placement tool, a camera control configured to enable the user to control a location and orientation of the first camera icon relative to the first actor icon;
access a script associated with the scene that includes a scene dialog a first portion of dialogue and a second portion of dialogue that is contiguous with and follows the first portion;
place, in response to an input from the user, a segment designator into the scene dialog to indicate that the first portion of dialogue that should be associated with a first projection and the second portion of dialogue that should be associated with a second projection, the segment designator being depicted as a designator in the scene dialog;
generate, based on the location and orientation of the first actor icon and the first camera icon, the first projection of the scene featuring the first actor as seen from the first camera; and
configure the first projection to reflect the first portion of dialogue.

* * * * *

UNITED STATES PATENT AND TRADEMARK OFFICE
CERTIFICATE OF CORRECTION

PATENT NO. : 8,443,284 B2
APPLICATION NO. : 11/780275
DATED : May 14, 2013
INVENTOR(S) : Lindley et al.

Page 1 of 1

It is certified that error appears in the above-identified patent and that said Letters Patent is hereby corrected as shown below:

In the Claims

In column 15, line 28, in Claim 24, after "dialog", insert --having--, therefor

In column 16, line 40, in Claim 26, after "dialog", insert --having--, therefor

Signed and Sealed this
Seventeenth Day of September, 2013

Teresa Stanek Rea
*Deputy Director of the United States Patent and Trademark Office*